United States Patent
Baik et al.

(10) Patent No.: US 12,118,071 B2
(45) Date of Patent: Oct. 15, 2024

(54) SYSTEM AND USER PATTERN AUTHENTICATION METHOD FOR PREVENTING SMUDGE AND SHOULDER SURFING ATTACK OF MOBILE DEVICE

(71) Applicant: EYL INC., Yongin-si (KR)

(72) Inventors: Jung Hyun Baik, Seongnam-si (KR); Seong Joon Cho, Seongnam-si (KR); Bu Suk Jeong, Yongin-si (KR); Dae Hyun Nam, Seoul (KR); Kang Won Suh, Yongin-si (KR)

(73) Assignee: EYL INC., Yongin-si (KR)

( * ) Notice: Subject to any disclaimer, the term of this patent is extended or adjusted under 35 U.S.C. 154(b) by 919 days.

(21) Appl. No.: 17/267,899

(22) PCT Filed: Mar. 27, 2019

(86) PCT No.: PCT/KR2019/003530
§ 371 (c)(1),
(2) Date: Feb. 11, 2021

(87) PCT Pub. No.: WO2020/040395
PCT Pub. Date: Feb. 27, 2020

(65) Prior Publication Data
US 2021/0209216 A1    Jul. 8, 2021

(30) Foreign Application Priority Data
Aug. 20, 2018    (KR) ........................ 10-2018-0096660

(51) Int. Cl.
*G06F 21/36* (2013.01)
*G06F 3/0488* (2022.01)
*G06F 3/04883* (2022.01)

(52) U.S. Cl.
CPC ............ *G06F 21/36* (2013.01); *G06F 3/0488* (2013.01); *G06F 3/04883* (2013.01)

(58) Field of Classification Search
USPC .............................................. 726/7
See application file for complete search history.

(56) References Cited

U.S. PATENT DOCUMENTS

| | | | |
|---|---|---|---|
| 9,600,688 B2 * | 3/2017 | Buck | G06F 21/50 |
| 2008/0015115 A1 * | 1/2008 | Guyot-Sionnest | G06F 3/0304 |
| | | | 506/40 |

(Continued)

FOREIGN PATENT DOCUMENTS

| | | | | |
|---|---|---|---|---|
| CN | 104915133 B | * | 5/2019 | G06F 1/3265 |
| CN | 105264480 B | * | 11/2019 | G06F 3/04847 |

(Continued)

OTHER PUBLICATIONS

Vaidya et al ("Invisible Touch Screen Based PIN Authentication to Prevent Should Surfing")2016 International Conference on Inventive Computation Technologies (ICICT). IEEE Proceedings: 536. pp. 1-4 (Year: 2016).*

(Continued)

*Primary Examiner* — Sakinah White Taylor
(74) *Attorney, Agent, or Firm* — NKL Law; Byungwoong Park (57) ABSTRACT

A pattern authentication method for preventing a smudge and a shoulder surfing attack. The pattern authentication method includes: a pattern registration step; and a pattern authentication step, in which the pattern registration step includes: a step of receiving a pattern from a user by an input unit of a pattern authentication device; a step of matching and storing a code value corresponding to the pattern input from the user by a matching unit; and a step of generating a user KDI (Key Derivation ID) by matching the code value to a quantum random number generated by a quantum random number generator by a KDI generator.

4 Claims, 7 Drawing Sheets

(56) References Cited

U.S. PATENT DOCUMENTS

| | | | | |
|---|---|---|---|---|
| 2015/0268849 A1* | 9/2015 | Beaumier | ............... | G07F 9/009 |
| | | | | 715/716 |
| 2016/0162672 A1* | 6/2016 | Grigg | ...................... | G06F 21/35 |
| | | | | 726/7 |
| 2016/0202857 A1* | 7/2016 | Rivera | ................... | G06Q 20/18 |
| | | | | 715/716 |
| 2017/0177851 A1* | 6/2017 | Sawant | ................... | G06F 21/36 |
| 2019/0294258 A1* | 9/2019 | Forlines | ................ | G06F 3/0202 |

FOREIGN PATENT DOCUMENTS

| | | | | |
|---|---|---|---|---|
| CN | 107797655 B | * | 11/2019 | .......... G06F 1/1684 |
| KR | 10-1085490 B1 | | 11/2011 | |
| KR | 10-2016-0091104 A | | 8/2016 | |
| KR | 10-1700799 B1 | | 1/2017 | |
| KR | 10-1887964 B1 | | 8/2018 | |
| WO | 2018/048051 A1 | | 3/2018 | |

OTHER PUBLICATIONS

Khedr ("Improved keylogging and shoulder-surfing resistant visual two-factor authentication protocol"), Journal of Information Security and Applications, ELSEVIER: 39. pp. 41-57 (Year: 2018).*
International Search Report issued on Jul. 29, 2019 in corresponding International application No. PCT/KR2019/003530; 4 pages.
SKT, "Applying quantum encryption to 5G • IoT", Maeil Business Newspaper article; URL: https://www.mk.co.kr/ news/business/view/2018/03/143352/; retrieved on Jul. 9, 2019; 5 pages.

* cited by examiner

| Index | A | B | C | D | E | F | G | H | I | HOK |
|---|---|---|---|---|---|---|---|---|---|---|
| Quantum number | 8b | e9 | 49 | de | 9e | 1f | e8 | 6a | a5 | 0-time |
| Generate KDI | 8b | | 49 | | 9e | 1f | | | | (default) |

| Index | A | B | C | D | E | F | G | H | I | HOK |
|---|---|---|---|---|---|---|---|---|---|---|
| Quantum number R1 | 8b | e9 | 49 | de | 9e | 1f | e8 | 6a | a5 | 0-time |
| Quantum number R2 | ab | 56 | 2f | aa | cd | ce | fc | c4 | 3d | 1-time |
| Quantum number R3 | e1 | 6e | 64 | e3 | 8b | d1 | 80 | fb | f3 | 2-time |
| Quantum number R4 | 05 | 49 | f6 | a8 | 72 | 08 | 04 | c5 | b7 | 3-time |
| Quantum number R5 | d1 | e9 | 3d | 20 | 89 | d9 | e9 | 7a | ef | 4-time |
| ⋮ | ⋮ | ⋮ | ⋮ | ⋮ | ⋮ | ⋮ | ⋮ | ⋮ | ⋮ | ⋮ |
| Quantum number RN | 32 | ef | d8 | 40 | 50 | e6 | 25 | 2f | e3 | N-time |
| Generate KDI | 05 | | f6 | | 72 | 08 | | | | 3-time |

Fig.9

| KDI.key | "ACEF" |
|---|---|
| KDI.HOK | 0 (default) |
| KDI.value | 8b49921f (Derived from the quantum random number table) |

(a)

| KDI.key | "ACEF" |
|---|---|
| KDI.HOK | 3 (3 click events) |
| KDI.value | 05f67208 (Derived from the quantum random number table) |

SYSTEM AND USER PATTERN AUTHENTICATION METHOD FOR PREVENTING SMUDGE AND SHOULDER SURFING ATTACK OF MOBILE DEVICE

FIELD

The present disclosure relates to a pattern authentication method for preventing a smudge and a shoulder surfing attack of a mobile device. In particular, the present disclosure relates to a user pattern authentication method that can prevent a smudge and a shoulder surfing attack through pattern authentication combining an event by a touch on a specific region of a mobile device and user pattern input.

BACKGROUND

As mobile devices are generally used, an interest in technology that prevents leakage of personal information is increasing. An authentication method using user input pattern that is generally used in mobile devices have an advantage of simplicity, but has a problem that it is vulnerable to the attacks of shoulder surfing hacking types (shoulder surfing, monitor recording, CCTV recording)

Korean Patent No. 10-1700799 (titled, "User terminal of having a should surfing protection and method") discloses a method of recombining corresponding strings by determining a gaze region and a non-gaze region of a user and Korean Patent No. 10-1085490 (titled, "system and method of inputting privacy protection type user password for coping with should surfing attack) disposes only a method of discriminating main number and peripheral numbers and inputting a password using different colors of keypads.

SUMMARY

An objective of the present disclosure relates to a pattern authentication method for preventing a smudge and a shoulder surfing attack of a mobile device, and particularly, is to provide a pattern authentication method for preventing a smudge and a shoulder surfing attack of a mobile device, the method of providing pattern authentication improving security using quantum random numbers induced by a true quantum random number generator (TQRNG) that is unpredictable, independent, and not biased when combining an event by a touch on a specific region of a mobile device and user pattern input.

A pattern authentication method for preventing a smudge and a shoulder surfing attack of a mobile device according to an embodiment of the present disclosure includes: a pattern registration step; and a pattern authentication step, in which the pattern registration step includes: a step of receiving a pattern from a user by means of an input unit of a pattern authentication device; a step of matching and storing a code value corresponding to the pattern input from the user by means of a matching unit; and a step of generating a user KDI (Key Derivation ID) by matching the code value to a quantum random number generated by a quantum random number generator by means of a KDI generator.

The pattern authentication step includes: a step of determining whether a user touches a specific region of the input unit of the pattern authentication device for a predetermined time; a step in a normal mode is changed into a substitution conversion mode and the code value is changed in accordance with the number of touches (HOK (Hidden One Click) by the user when it is determined that the user has touched the specific region for a predetermined time; a step of receiving a pattern from the user by means of the input unit of the pattern authentication device; a step of matching and storing a code value corresponding to the pattern input by the user by means of the matching unit; and a step of generating a user KDI by matching the code value and a quantum random number table induced through quantum random numbers by means of the KDI generator.

According to the present disclosure, it is possible to more easily defense a smudge and a shoulder surfing attack by another person only using a pattern input and a touch event on a specific region on a mobile device by a user.

It is possible to increase accessibility and convenience for a user through pattern authentication and it is possible to enhance security using quantum random numbers.

BRIEF DESCRIPTION OF THE DRAWINGS

FIGS. 4(a) to 4(c) are views illustrating a pattern authentication method according to an embodiment of the present disclosure.

DESCRIPTION OF EXEMPLARY EMBODIMENTS

The description of specific structures and functions of embodiments according to the spirit of the present disclosure described herein are provided as examples for describing the embodiments according to the spirit of the present disclosure. The embodiments according to the spirit of the present disclosure may be implemented in various ways and the present disclosure is not limited to the embodiments described herein.

Embodiments described herein may be changed in various ways and various shapes, so specific embodiments are shown in the drawings and will be described in detail in this specification. However, it should be understood that the exemplary embodiments according to the concept of the present disclosure are not limited to the specific examples, but all of modifications, equivalents, and substitutions are included in the scope and spirit of the present disclosure.

The terminology used herein is for the purpose of describing particular embodiments only and is not intended to limit the present disclosure Singular forms are intended to include plural forms unless the context clearly indicates otherwise. It will be further understood that the terms "comprises" or "have" used in this specification, specify the presence of stated features, numbers, steps, operations, components, parts, or a combination thereof, but do not preclude the presence or addition of one or more other features, numerals, steps, operations, components, parts, or a combination thereof.

Hereinafter, various embodiments of the present disclosure will be described in detail with reference to the accompanying drawings.

Figure 1:
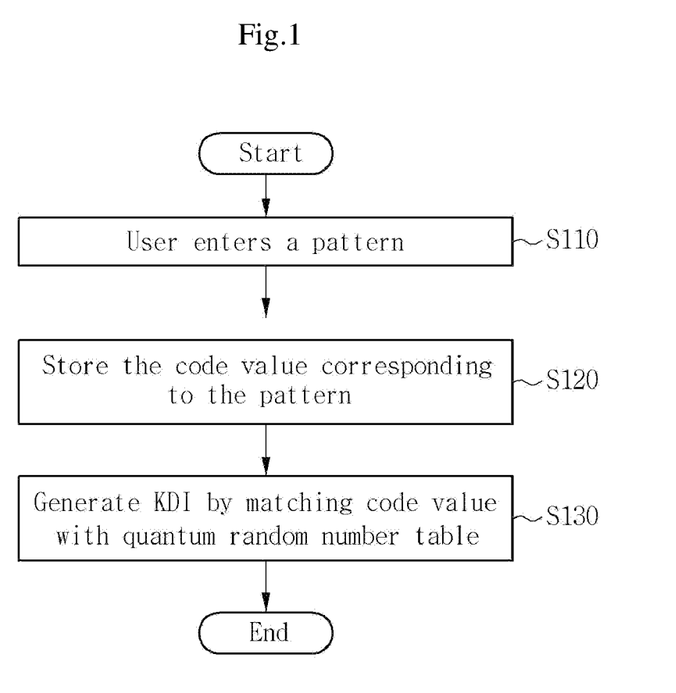
FIG. 1 is a view illustrating a pattern registration step of a pattern authentication method according to an embodiment of the present disclosure.

FIG. 1 is a view illustrating a pattern registration step of a pattern authentication method according to an embodiment of the present disclosure.

Referring to FIG. 1, as a pattern registration step of a pattern authentication method for preventing a smudge and a shoulder surfing attack of a mobile device, first, an input unit 110 of a pattern authentication device receives a pattern input by a user (S110). The pattern input from the user may be a pattern having at least three or more apexes connected to each other for security. When a pattern having three or less apexes connected to each other is input, it is possible to induce the user to input a pattern again.

Thereafter, a matching unit 140 extracts a code value matched to the pattern input from the user and stores the extracted code value in a storage unit (S120). In the code value, a separate alphabet may be matched to each point, but is not limited thereto.

A KDI (Key derivation ID) generator 130 generates a user KDI by matching the matched code value to a quantum random number table (S130). The quantum random number table is a table composed of several quantum random numbers generated by a quantum random number generator 120 of the pattern authentication device 10, and the quantum random numbers induced by a true quantum random number generator that is unpredictable, independent, and not biased.

Figure 2:
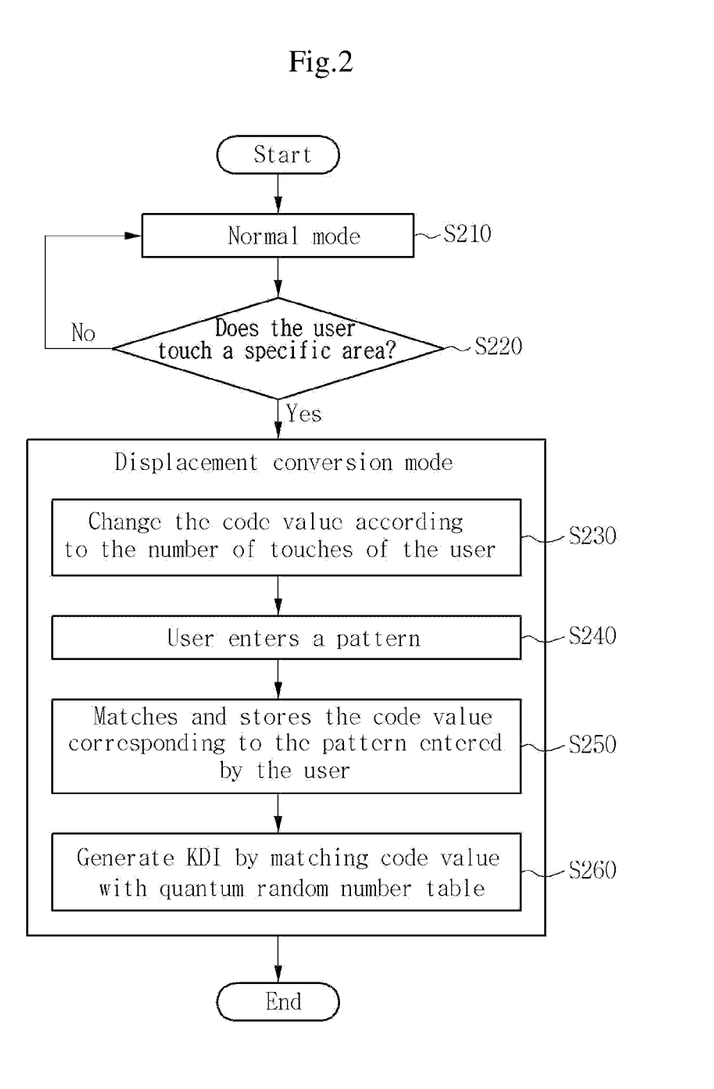
FIG. 2 is a view illustrating a pattern authentication step of the pattern authentication method according to an embodiment of the present disclosure.

FIG. 2 is a view illustrating a pattern authentication step of the pattern authentication method according to an embodiment of the present disclosure.

Referring to FIG. 2, as a pattern authentication step of the pattern authentication method for preventing a smudge and a shoulder surfing attack of a mobile device, first, the input unit senses a touch event on a specific region from the user after the pattern registration step (S220). The specific region may be fundamentally positioned at a side of the lower end portion of a mobile device, and may be a button that can sense an event but which may not be shown to the user or attackers. That is, it may be an HOK (hidden One Click) button at a side of the lower end portion of an App, but may be an input unit that can sense a click event on a mobile device by a user but is not limited thereto. Depending on embodiments, a click even may be input on the specific region by a physical button. The touch event may be generated in accordance with the number of touches or a touch tempo and the touch tempo means different intervals between touches.

Figure 3:
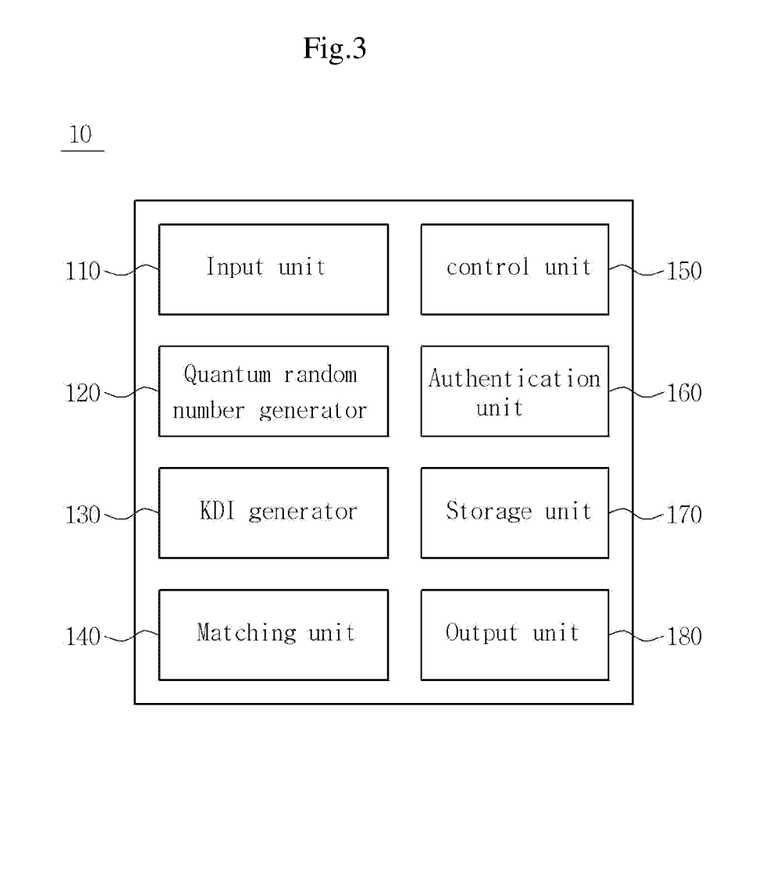
FIG. 3 is a view illustrating a pattern authentication device according to an embodiment of the present disclosure.

FIG. 3 is a view illustrating a pattern authentication device according to an embodiment of the present disclosure.

Referring to FIG. 3, the pattern authentication device 10 includes an input unit, a quantum random number generator 120, a KDI generator 130, a matching unit 140, a control unit 150, an authentication unit 160, a storage unit 170, and an output unit 180. The pattern authentication device 10, which is a user terminal on wired and wireless networks, may be a mobile computing device that can perform processes determined by the operating system software and various items of application software and can be easily used while moving because it is easy to move, such as a smartphone and a tablet PC, but is not limited thereto.

When the input unit 110 senses a touch event on a specific region, a normal mode may be changed into a substitution conversion mode. The normal mode refers to a fundamental state of a mobile device or a mobile App in which the touch even of a KDI is set as 0 that is a default, and may control the device to generate vibration or a sound as feedback when there is a touch event by a user.

The input unit 110 receives a pattern from a user (S240). Thereafter, the matching unit 140 matches and stores a code value corresponding to the pattern input by the user in the storage unit (S250). The KDI generator 130 generates a user KDI by matching the code value to the quantum random number table (S260). The user KDI generates a new quantum random number table for each registration and login and performs authentication for each login, whereby security can be further enhanced.

The input unit 110 receives an input event that is executed by an input device. The input unit 110 may be a touch screen and transmits a touch even to the control unit 150.

The quantum random number table is a table including several quantum random numbers generated by the quantum random number generator 10 and the quantum random numbers may be quantum random numbers induced by a true quantum random number generator (TQRNG) that is unpredictable, independent, and not biased.

A KDI (Key derivation ID) generator 130 generates a user KDI by matching the code value to a quantum random number table (S130). The quantum random number table is a table including several quantum random numbers generated by the quantum random number generator, and the quantum random numbers are quantum random numbers induced and generated by a true quantum random number generator (TQRNG) that is unpredictable, independent, and not biased. The security of the user KDI can be further enhanced by generating each quantum random number and performing authentication using the random number for each login.

The matching unit 140 can match a pattern (e.g., points and connection lines of the points) input by a user and a code value (e.g., an alphabet corresponding to each point) corresponding to the pattern.

The control unit 150 controls processing of a process related to execution of application software and controls the operation of the components of the pattern authentication device 10.

The authentication unit 160 can perform authentication using the generated user KDI. It is possible to determine whether it coincides with the information stored in the storage unit.

The storage unit 170 can match and store a code value that is changed in the substitution conversion mode.

The output unit 180 can output vibration or a sound when a user inputs a touch.

Figure 4:
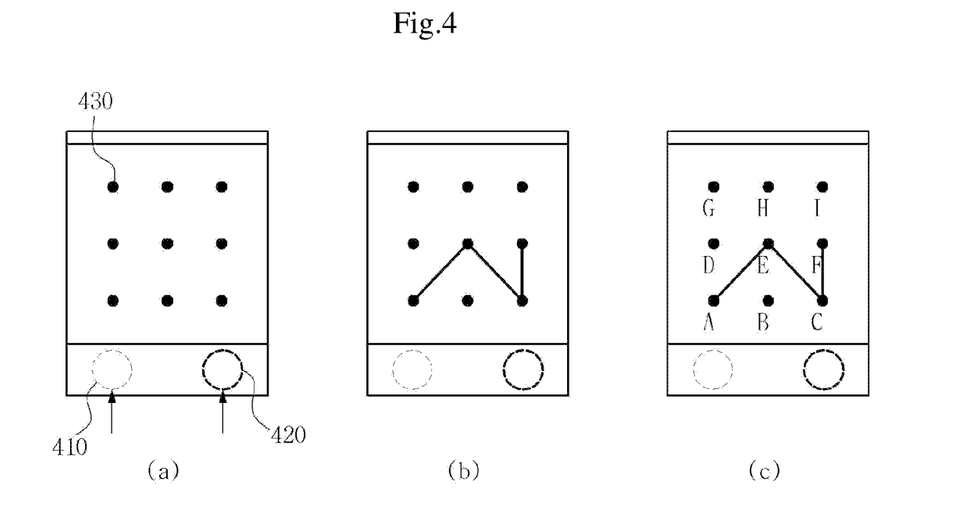
Figure 5:
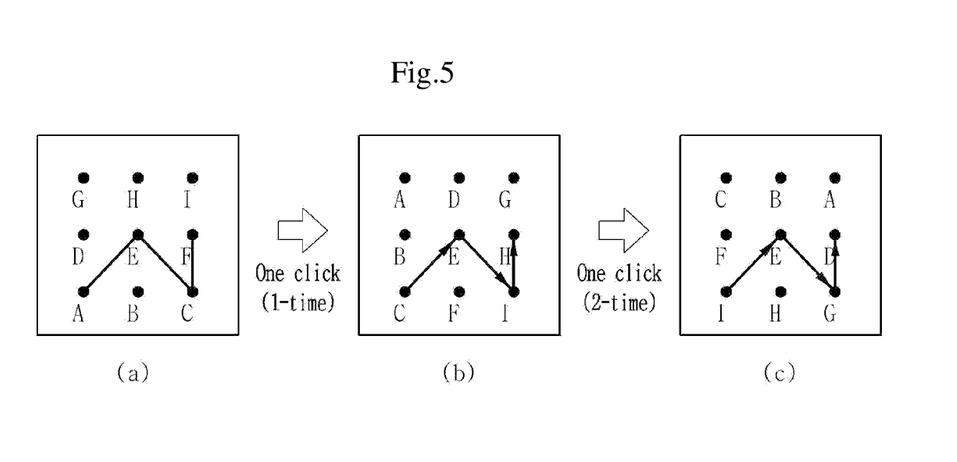
FIG. 5 is a view illustrating a pattern authentication method according to an embodiment of the present disclosure.
Figure 6:
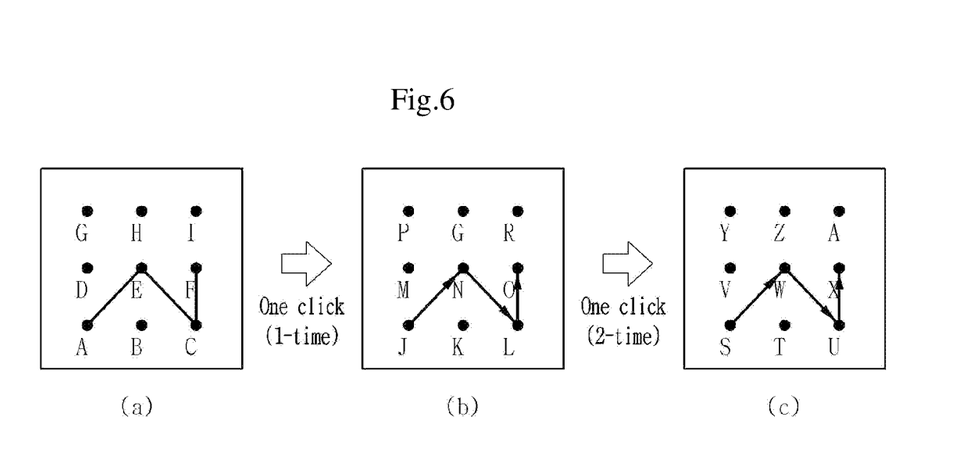
FIG. 6 is a view illustrating a pattern authentication method according to an embodiment of the present disclosure.

FIGS. 4 to 6 are views illustrating a pattern authentication method according to an embodiment of the present disclosure.

Referring to FIGS. 4(a) to 4(c), a first region 410 and a second region 420 may be disposed at the lower end portion of the pattern authentication device 10. The first region 410 and the second region 420 may be disposed in parallel with a predetermined gap therebetween. When a user touches at least one of the first region 410 and the second region 420, the substitution conversion mode can be entered. The first region 410 is disposed to correspond to the left thumb and the second region 420 is disposed to correspond to the right thumb, whereby convenience for the user is improved. Several apexes 430 may be displayed on the input unit of the pattern authentication device 10 so that a user can input a pattern. The code values (alphabets) matched to points, respectively, and pattern lines may not be shown to a user by the default.

Referring to FIG. 5, a user finishes setting by inputting a pattern by connecting four apexes. Thereafter, when the user touches the first region 410 or the second region 420 one time, the code values matched to the apexes may generate a 'CEIH' value, and when the user touches two times, the code value may be 'IEGD'. The embodiment of the FIG. 5 may be implemented such that when a user touches, the code values are rotationally changed in the substitution conversion mode.

Referring to FIG. 6, when a user touches in the substitution conversion mode, the code values may be changed in accordance with the order of alphabets. For example, when a user touches the first region 410 or the second region 420 one time, the code values matched to the apexes may generate a INLO' value, and when the user touches two times, the code value may be 'SWUX'.

Figure 7:
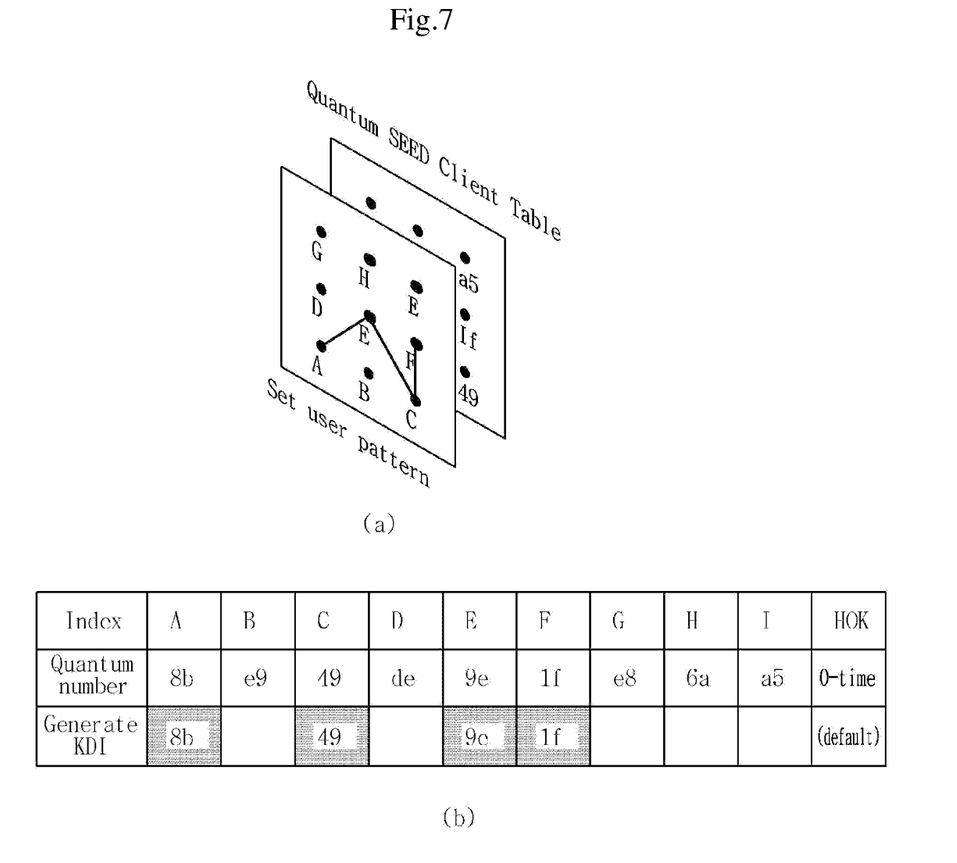
FIGS. 7(a) and 7(b) are views illustrating a user KDI generation method according to an embodiment of the present disclosure.
Figure 8:
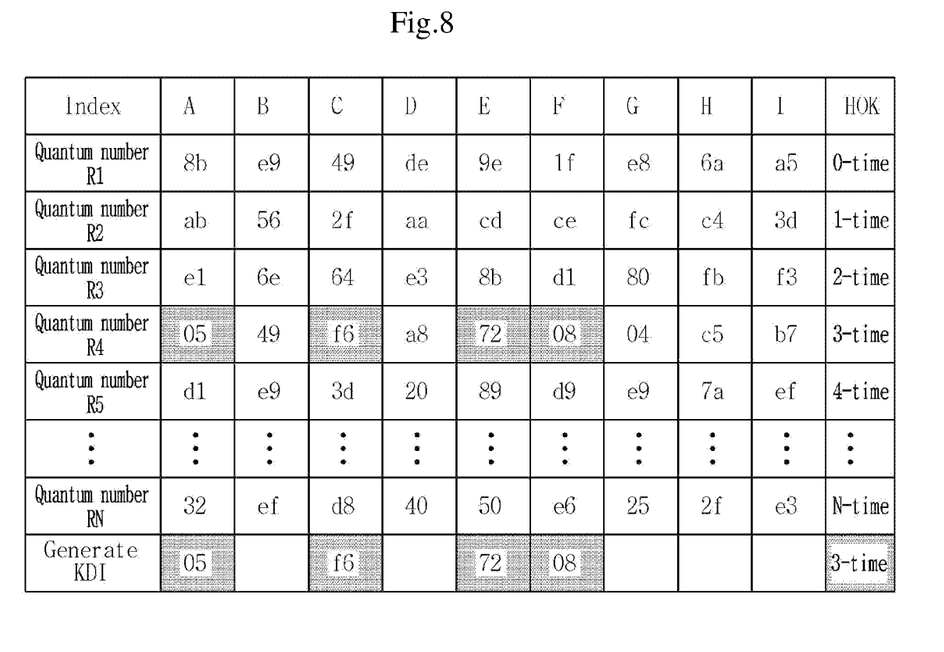
FIG. 8 is a view illustrating a user KDI generation method according to an embodiment of the present disclosure.

FIGS. 7 to 8 are views illustrating a user KDI generation method according to an embodiment of the present disclosure.

Referring to FIG. 7, it is possible to generate a user KDI by matching generated code values and quantum random numbers generated by the quantum random number generator. The user KDI is generated by matching the code values to a quantum random number table generated by the quantum random number generator. That is, when an AECF pattern is input, a random sequence '8b93491f' may be generated as the user KDI. value.

Referring to FIG. 8, a more secured random sequence may be generated by matching code numbers to the quantum random number table including quantum random numbers in accordance with the number of touch events by a user.

Figure 9:
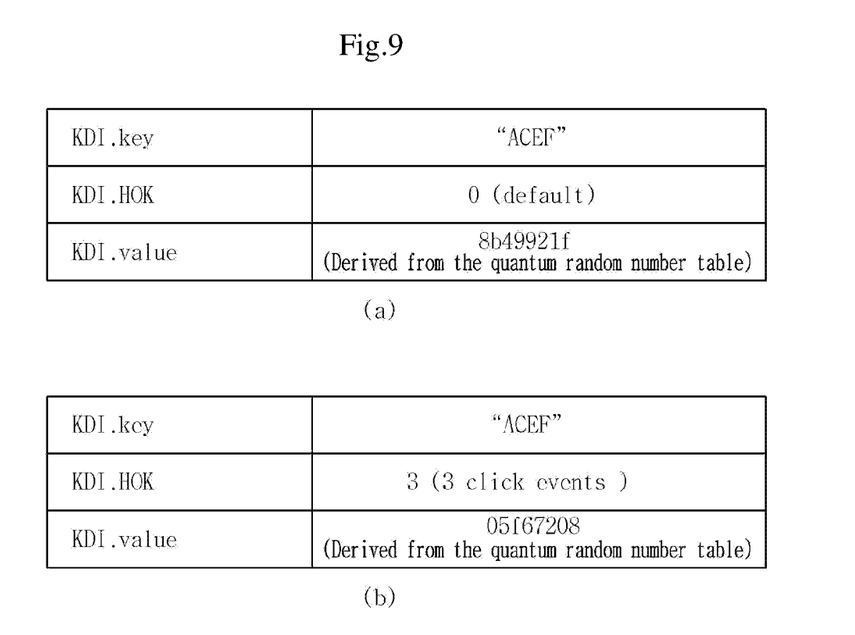
FIGS. 9(a) and 9(b) are views illustrating a user KDI generation method according to an embodiment of the present disclosure.

When a user touch event (HOK) is three times and an ACEF pattern is input, random numbers of '05f67208' may be generated as the user KDI. value. There is an effect that security is enhanced by generating and registering a user KDI matched to the quantum random number table including new quantum random numbers at each login. FIG. 9 exemplifies KDI code information that is stored by an authentication sever according to an embodiment of the present disclosure.

Figure 10:
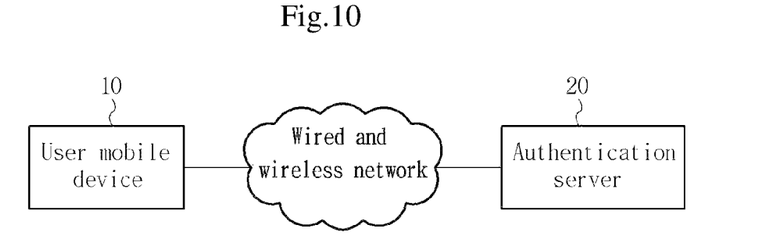
FIG. 10 is a configuration view of a pattern authentication system according to an embodiment of the present disclosure.

FIG. 10 is a schematic configuration view of the pattern authentication system 1 for preventing a smudge and shoulder surfing according to an embodiment of the present disclosure. The pattern authentication system 1 includes a user mobile device 10 and an authentication sever, in which the user mobile device 10 can operate as the pattern authentication device 10 of the present disclosure.

Although the present disclosure has been described with reference to the exemplary embodiments illustrated in the drawings, those are only examples and may be changed and modified into other equivalent exemplary embodiments from the present disclosure by those skilled in the art. Therefore, the technical protective range of the present disclosure should be determined by the scope described in claims.

What is claimed is:

1. A pattern authentication method for preventing a smudge and a shoulder surfing attack on wired and wireless networks, the pattern authentication method comprising:
    a pattern registration step; and
    a pattern authentication step,
    wherein the pattern registration step includes:
    a step of receiving a pattern from a user by an input unit of a pattern authentication device;
    a step of matching and storing a code value corresponding to the pattern input from the user by a matching unit; and
    a step of generating a user KDI (Key Derivation ID) by matching the code value to a quantum random number generated by a quantum random number generator by a KDI generator,
    wherein the pattern authentication step includes:
    a step of determining whether a user touches a specific region of the input unit of the pattern authentication device for a predetermined time;
    a step in a normal mode is changed into a substitution conversion mode and the code value is changed in accordance with the number of touches by the user and a touch tempo when it is determined that the user has touched the specific region for a predetermined time;
    a step of receiving a pattern from the user by the input unit of the pattern authentication device;
    a step of matching and storing a code value corresponding to the pattern input by the user by the matching unit; and
    a step of generating a user KDI by matching the code value and a quantum random number table by the KDI generator.

2. The pattern authentication method of claim 1, wherein the specific region is divided into a first region and a second region, first region and the second region are disposed at a side of a lower end portion of a mobile device for convenience of user's left thumb and right thumb, respectively, and a touch event is input from the user through an HOK (Hidden One Click) button that is not shown to the user and shoulder surfing attackers on a touch screen.

3. The pattern authentication method of claim 2, wherein the specific region is a region that senses a click event of the user on the touch screen of the mobile device.

4. The pattern authentication method of claim 2, wherein a click event is input by a physical button of the specific region.

* * * * *